(12) United States Patent
Beck et al.

(10) Patent No.: US 10,641,373 B2
(45) Date of Patent: May 5, 2020

(54) POWER-SPLIT CONTINUOUSLY VARIABLE TRANSMISSION DEVICE

(71) Applicant: ZF Friedrichshafen AG, Friedrichshafen (DE)

(72) Inventors: Stefan Beck, Eriskirch (DE); Viktor Warth, Friedrichshafen (DE); Michael Wechs, Weißensberg (DE); Bernhard Sich, Friedrichshafen (DE); Fabio Frank, Ravensburg (DE); Jens Moraw, Friedrichshafen (DE); Gerhard Niederbrucker, Friedrichshafen (DE); Lara Ruth Turner, Immenstaad (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 42 days.

(21) Appl. No.: 16/170,605

(22) Filed: Oct. 25, 2018

(65) Prior Publication Data
US 2019/0120352 A1    Apr. 25, 2019

(30) Foreign Application Priority Data
Oct. 25, 2017    (DE) .................. 10 2017 219 111

(51) Int. Cl.
| | |
|---|---|
| *F16H 37/08* | (2006.01) |
| *B60K 6/365* | (2007.10) |
| *B60K 6/48* | (2007.10) |
| *B60K 6/543* | (2007.10) |
| *B60K 6/547* | (2007.10) |
| *F16H 3/66* | (2006.01) |

(Continued)

(52) U.S. Cl.
CPC ........... *F16H 37/086* (2013.01); *B60K 6/365* (2013.01); *B60K 6/48* (2013.01); *B60K 6/543* (2013.01); *B60K 6/547* (2013.01); *F16H 3/66* (2013.01); *B60K 2006/4825* (2013.01); *B60Y 2200/92* (2013.01); *F16H 15/28* (2013.01); *F16H 2003/442* (2013.01); *F16H 2037/023* (2013.01); *F16H 2200/0039* (2013.01); *F16H 2200/201* (2013.01); *F16H 2200/2038* (2013.01); *F16H 2200/2097* (2013.01)

(58) Field of Classification Search
None
See application file for complete search history.

(56) References Cited

U.S. PATENT DOCUMENTS

| | | |
|---|---|---|
| 9,810,300 B2 | 11/2017 | Warth et al. |
| 2016/0109002 A1 | 4/2016 | Schoolcraft |

FOREIGN PATENT DOCUMENTS

| | | |
|---|---|---|
| DE | 102013223243 | 5/2015 |
| WO | WO 2014/179717 | 11/2014 |

*Primary Examiner* — Timothy Hannon
(74) *Attorney, Agent, or Firm* — Dority & Manning, P.A.

(57) ABSTRACT

A variator unit is fixed to a rotationally fixed component and has a secondary side rotationally fixed to an input shaft and a primary side rotationally fixed to a first element of a first planetary gear set. The input shaft is rotationally fixable via a second shift element to a second element of a second planetary gear set, which is fixable to the rotationally fixed component via a first shift element, and is rotationally fixed to a first element of a third planetary gear set. A second element of the first planetary gear set is fixed to the rotationally fixed component. A first element of the second planetary gear set is rotationally fixed to a third element of the third planetary gear set. A third element of the first planetary gear set is rotationally fixed to a third element of the second planetary gear set.

9 Claims, 8 Drawing Sheets

(51) Int. Cl.
  *F16H 15/28* (2006.01)
  *F16H 3/44* (2006.01)
  *F16H 37/02* (2006.01)

| Mode | Engaged Shift Elements | | |
|---|---|---|---|
| | Brake | Clutches | |
| | B1 | K1 | K2 |
| FB1 | X | | |
| FB2 | | | X |
| FB3 | | X | |

Fig. 3

POWER-SPLIT CONTINUOUSLY VARIABLE TRANSMISSION DEVICE

FIELD OF THE INVENTION

The present invention relates to a power-split continuously variable transmission device, in particular a continuously variable planetary transmission. The invention further relates to a motor vehicle drive train having a power-split continuously variable transmission device.

BACKGROUND

US20160109002A1 describes such a continuously variable transmission which is considered to be the closest prior art.

WO2014179717 also describes a continuously variable transmission, having a NuVinci variator, a plus planetary gear set, a minus planetary gear set, and an arrangement of multiple clutches, which makes two forward modes and one reverse mode available.

DE102013223243 describes a power-split continuously variable transmission device having a summarizing planetary transmission, at least one further planetary gear set, and a variator, which are operatively connected to each other in the area of shafts and which are coupleable to each other in the area of further shafts via shift elements in order to implement at least three ranges of ratios. A ratio is continuously variable within the ranges of ratios via the variator. The variator is a mechanical toroidal variator including at least three shafts. The summarizing planetary transmission, the at least one further planetary gear set, and the variator are arranged coaxially to each other. In one of the ranges of ratios, the total power is guidable between a transmission input shaft and a transmission output shaft via the variator. In addition, one friction wheel of the variator is at least approximately tapered at least in some areas.

Continuously variable transmissions, which are also referred to as CVT transmissions, can continuously control the transmission ratio between the lowest and the highest ratios, for example, with the aid of a so-called variator. This is different from typical transmissions, in which a number of predetermined (discrete) transmission ratios are provided. A CVT transmission can be a mechanical continuously variable transmission, for example, in the form of a flexible traction drive mechanism or a friction drive such as a cone ring or toroidal transmission.

The basic active principles of mechanical continuously variable transmissions are always the same, regardless of their construction. The power transmission takes place, without conversion of the form of energy, in a force-locking manner, by way of the friction-locking contact of two or more contact bodies which are moving relative to each other and which are usually referred to as a primary and a secondary disk, which are also referred to as a primary and a secondary side, wherein the two disks are formed from conical disks arranged in pairs and are provided with a torque-transmitting wrap-around element which revolves between the two pairs of conical disks.

Depending on the type of construction, very high full-load efficiencies are possible, which substantially exceed those of the hydrostatic transmission. The transmission ratio of mechanical CVTs is always determined by their active friction radii ratio, i.e., the current ratio is defined by the running radius of the wrap-around element, which, in turn, is a function of the axial position of the conical disks and, therefore, is subjected to geometric limits which prevent an immediate implementation of the starting process.

In order to overcome these limitations on the overall gear ratio of mechanical CVTs, it is useful to operate the mechanical CVTs in power-splitting transmission structures, such as in a combination of one or multiple planetary transmissions comprising a continuously variable transmission. Such a transmission, which is also referred to as an IVT transmission (infinitely variable transmission), can gear down between a fixed ratio value and any reduced speed in one transmission direction, i.e., infinitely, or even in the opposite direction, i.e., negatively, and so the input shaft rotates while the output shaft is at a standstill.

In the case of such a transmission, therefore, the spread of gear ratios of the variator are expandable, by reactive power-based operation at low speeds, in such a way that an immediate implementation of the starting process becomes possible, i.e., the vehicle is at a standstill with an "infinite" ratio, while the engine is running, without an additional separating clutch.

Due to the utilization as a power-split transmission, the power flow is guidable along one or multiple power paths. For example, the power is guidable along a first path by the variator or along a second path by way of the planetary transmission. The power is also returnable into the variator, whereby the load on the variator is increased during the operation of the continuously variable transmission.

The problem addressed by the present invention is that of making an alternative continuously variable transmission available, which has a simple configuration and a compact design.

SUMMARY OF THE INVENTION

According to the invention, the transmission device includes an input shaft and an output shaft, a first planetary gear set which is arranged between the input shaft and the output shaft, a second planetary gear set which is connected to the first planetary gear set and is arranged between the input shaft and the output shaft, a third planetary gear set which is connected to the second planetary gear set and is arranged between the input shaft and the output shaft, and a variator unit which transmits power in an infinitely variable manner from the input shaft to the first planetary gear set. The variator unit includes a first shift element, a second shift element, and a third shift element, the selective actuation of which provides different power paths between the input shaft and the output shaft while making a first mode, a second mode, and a third mode available.

Within the meaning of the invention, a "shaft" is understood to be a rotatable component of the transmission, via which associated components of the transmission are axially and/or radially rotationally fixed to each other or via which a connection of this type is established upon actuation of an appropriate shift element. The respective shaft can therefore also be an intermediate piece, via which a respective component is connected, for example, radially.

The invention now encompasses the technical teaching that the variator unit is fixed to a rotationally fixed component, a secondary side of the variator unit is rotationally fixed to the input shaft, and a primary side of the variator unit is rotationally fixed, via a third shaft, to a first element of the first planetary gear set.

The input shaft is also rotationally fixable, via the second shift element, to a second element of the second planetary gear set and is rotationally fixed to a first element of the third planetary gear set.

A second element of the first planetary gear set is fixed to the rotationally fixed component. The second element of the second planetary gear set is fixable, via the first shift element, to the rotationally fixed component.

A first element of the second planetary gear set is rotationally fixed to a third element of the third planetary gear set. A third element of the first planetary gear set is rotationally fixed to a third element of the second planetary gear set. A second element of the third planetary gear set is rotationally fixed to the output shaft and, in addition, is rotationally fixable, via the third shift element, to the third element of the first planetary gear set and to the third element of the second planetary gear set.

In other words, in the transmission device according to the invention, the input shaft is rotationally fixed to the variator unit, while the output shaft is rotationally fixed to the second element of the third planetary gear set.

The second element of the first planetary gear set is permanently rotationally fixed to a rotationally fixed component of the transmission. Upon actuation of the first shift element, the second element of the first planetary gear set is rotationally fixed to the second element of the second planetary gear set, and the second element of the second planetary gear set is therefore prevented from making a turning motion.

Upon actuation of the second shift element, the second element of the second planetary gear set is rotationally fixed to the input shaft.

Upon actuation of the third shift element, the third element of the second planetary gear set and the third element of the first planetary gear set are rotationally fixed to the second element of the third planetary gear set and, therefore, to the output shaft.

The rotationally fixed component of the transmission is, according to the invention, a permanently non-rotating component of the transmission, preferably a transmission housing or a part of a transmission housing of this type.

In the transmission according to the invention, the first shift element is a brake which, upon actuation, decelerates the particular associated component of the transmission to a standstill and fixes the component against the rotationally fixed component. By contrast, each of the second shift element and the third shift element is a clutch which, upon actuation, synchronizes the turning motions of the associated rotatable components of the transmission device and subsequently rotationally fixes these to each other.

The shift elements are form-fit as well as force-locking shift elements. Examples of form-fit shift elements are so-called toothed shift elements, which are also known as constant-mesh shift elements, or synchronously shiftable shift elements. Examples of force-locking or friction-locking shift elements are lamellar shift elements.

A respective rotationally fixed connection of the rotatable elements of the planetary gear sets is preferably implemented, according to the invention, via one or even multiple intermediate shafts present, in this case, as short axial and/or radial intermediate pieces when the elements are positioned in a spatially dense manner. Specifically, each of the elements of the planetary gear sets, which are permanently rotationally fixed to each other, is several individual components which are rotationally fixed together, or even a single piece. In the second case mentioned above, the respective elements and the optionally present shaft are then formed by one common component, wherein this is implemented, in particular, when the respective elements lie spatially close to each other in the transmission.

In the case of elements of the planetary gear sets, which are rotationally fixed to each other only upon actuation of a respective shift element, a connection is also preferably achieved via one or even multiple intermediate shafts.

It has been found that, by way of the invention, a transmission device is made available, which has a simple configuration having precisely three planetary gear sets and three shift elements, has a compact design and, in addition, is distinguished by the fact that transmission losses are low. In contrast to the closest prior art, where the variator unit is bridged for individual modes, according to the invention, the power is always at least partially implementable via the variator unit, i.e., the variator unit is involved in all three modes. In addition, the transmission has only low component loads and, in particular, a low variator load. The transmission device is particularly suitable as a front-transverse or rear-transverse arrangement including a lateral driven end.

In principle, the most common mechanical variators are conceivable, which have a reverse direction of rotation from the primary side to the secondary side. Exemplary embodiments of these mechanical variators are a cone ring or planetary roller variator.

According to one embodiment, it is preferred, however, that the variator is a planetary roller variator, since such a variator does not have a reversal of the direction of rotation between the two sides of the variator.

Moreover, it is preferred that the three planetary gear sets are arranged axially adjacent to each other, originating from a mounting interface of the input shaft of the transmission device. Within the meaning of the invention, the term "axially" means an orientation in the direction of an axis along which the first planetary gear set and the second planetary gear set are arranged coaxially to each other.

In one alternative embodiment, it is preferred that the second planetary gear set is arranged radially outside the third planetary gear set. As a result, an axially even more compact type of construction is achievable. "Radially" is then understood to mean an orientation in the direction of the diameter of a shaft lying on this axis.

Due to the simple design, a transmission device is preferred, wherein each of the first, second, and third planetary gear sets is a minus planetary gear set, wherein the first element of the first planetary gear set is a sun gear, the second element of the first planetary gear set (RS1) is a planet carrier, and the third element of the first planetary gear set is a ring gear, wherein the first element of the second planetary gear set is a sun gear, the second element of the second planet carrier is a planet carrier, and the third element of the second planetary gear set is a ring gear, wherein the first element of the third planetary gear set is a sun gear, the second element of the third planetary gear set is a planet carrier, and the third element of the third planetary gear set is a ring gear.

Where permitted by a connection of the individual elements, a minus planetary gear set is convertible into a plus planetary gear set, wherein, as compared to the minus planetary gear set, the ring gear connection and the planet carrier connection are then to be interchanged, and a stationary transmission ratio is to be increased by one. Conversely, a plus planetary gear set is also replaceable by a minus planetary gear set, provided the connection of the elements of the transmission enables this. In this case, as compared to the plus planetary gear set, the ring gear connection and the planet carrier connection would also need to be interchanged, and a stationary transmission ratio would need to be reduced by one.

It is preferred that each of the first and third planetary gear sets is a minus planetary gear set and the second planetary gear set is a plus planetary gear set, wherein each first element of the first and third planetary gear sets is a sun gear, each second element of the first and third planetary gear sets is a planet carrier, and each third element of the first and third planetary gear sets is a ring gear, wherein the first element of the second planetary gear set is a sun gear, the second element of the second planetary gear set is a ring gear, and the third element of the second planetary gear set is a planet carrier.

It is further preferred that each of the first and second planetary gear sets is a minus planetary gear set and the third planetary gear set is a plus planetary gear set, wherein each first element of the first and second planetary gear sets is a sun gear, each second element of the first and second planetary gear sets is a planet carrier, and each third element of the first and second planetary gear sets is a ring gear, wherein the first element of the third planetary gear set is a sun gear, the second element of the third planetary gear set is a ring gear, and the third element of the third planetary gear set is a planet carrier.

The minus planetary gear set is also known as a simple planetary gear set. As is known, a minus planetary gear set includes planet gears, which are rotatably mounted on a planet carrier, i.e., carrier, and intermesh with the sun gear and the ring gear of this planetary gear set, and so, with the planet carrier held and the sun gear rotating, the ring gear rotates in the direction of rotation counter to that of the sun gear.

As is known, a plus planetary gear set includes inner and outer planet gears, which are rotatably mounted on the planet carrier of the plus planetary gear set and are in tooth engagement with one another, wherein the sun gear of this planetary gear set intermeshes with the inner planet gears, and the ring gear of this planetary gear set intermeshes with the outer planet gears, and so, with the planet carrier held and the sun gear rotating, the ring gear rotates in the same direction of rotation as the sun gear.

It is further preferred that, a continuously variable power-split first mode, in particular a first forward mode, is implemented when the first shift element is engaged, and/or, wherein a continuously variable second mode, in particular a second forward mode, is implemented when the third shift element is engaged, and/or, wherein a continuously variable power-split third mode, in particular a third forward mode, is implemented when the second shift element is engaged. The first mode is reversible, i.e., implemented as a reverse mode, by adjusting the variator unit.

The term "power-split" means that the power paths between the input shaft and the output shaft take place via the variator unit as well as via at least one further planetary gear set. In contrast thereto, "variable" means that the power paths between the input shaft and the output shaft take place exclusively via the variator unit. The power paths in the power-split mode as well as in the variable mode take place in a infinitely variable manner.

It has been shown that a low variator load is achievable in the second mode.

In one refinement of the invention, an electric machine is provided, the rotor of which is coupled in a rotationally fixed manner to one of the rotatable components of the transmission, i.e., to the input shaft, the output shaft, one of the shafts, or to one of the three elements of the planetary gear sets. It is preferred that a stator of the electric machine is rotationally fixed to the rotationally fixed component of the transmission. In addition, the electric machine is operable, in this case, as an electric motor and/or as a generator in order to implement different functions. In particular, purely electric driving, boosting via the electric machine, deceleration and recuperation, and/or synchronization in the transmission are implementable via the electric machine. The rotor of the electric machine is coaxial to the respective component or axially offset to the respective component, wherein, in the latter case, a coupling via one or multiple intermediate transmission ratio steps, for example, in the form of spur gear stages, or even a flexible traction drive mechanism, such as a chain or belt drive, is then implementable.

Preferably, however, the rotor of the electric machine is coupled in a rotationally fixed manner to the input shaft, wherein, as a result, purely electric travel of the motor vehicle is implemented in a suitable way. It is further preferred that one or several of the shift elements is/are utilized as internal starting components for electric driving. As an alternative, however, a separate launch clutch is usable as a starting component, which is positioned between the electric machine and the variator unit.

According to yet another design option of the invention, which is implemented, in particular, in combination with the aforementioned arrangement of an electric machine, a separating clutch is also provided, via which the input shaft is connectable in a rotationally fixed manner to a connecting shaft. The connecting shaft is utilized within a motor vehicle drive train as the connection to the drive machine. Providing the separating clutch has the advantage, in this case, that a connection to the driving machine is interruptible during the purely electric driving, whereby the drive machine is not entrained. The separating clutch is preferably, in this case, a friction-locking shift element, such as a multi-disk clutch, or is a form-fit shift element, such as a dog clutch or a lock-synchronizer mechanism.

The transmission according to the invention is, in particular, part of a motor vehicle drive train and is arranged between a drive machine of the motor vehicle, which is particularly an internal combustion engine, and further components of the drive train, which follow in the direction of power flow to driving wheels of the motor vehicle. In this case, the input shaft of the transmission is either permanently coupled to a crankshaft of the internal combustion engine in a rotationally fixed manner or is connectable thereto via an intermediate separating clutch or a starting component, wherein a torsional vibration damper is also providable between the internal combustion engine and the transmission. On the output end, the transmission is then preferably coupled, within the motor vehicle drive train, to an axle transmission of a drive axle of the motor vehicle, and optionally to an interaxle differential via which a distribution to multiple driven axles of the motor vehicle takes place. The axle transmission or the interaxle differential can be arranged with the transmission in one common transmission housing in this case. A torsional vibration damper can also be integrated into this transmission housing.

Within the meaning of the invention, the expressions that two components of the transmission are "connected", i.e., "coupled" in a rotationally fixed manner, i.e., "are connected to each other" mean a permanent connection of these components, and therefore these components cannot rotate independently of each other. In that respect, no shift element is provided between these components, which can be elements of the planetary gear sets and/or even shafts and/or a rotationally fixed component of the transmission. Instead, the corresponding components are rigidly connected to each other.

However, if a shift element is provided between two components of the transmission, these components are not permanently coupled to each other in a rotationally fixed manner. Instead, a rotationally fixed coupling is carried out only by actuating the intermediate shift element. In this case, an actuation of the shift element means, within the meaning of the invention, that the respective shift element is transferred into an engaged condition and consequently synchronizes the turning motions of the components coupled directly thereto. In the case of an embodiment of the respective shift element as a form-fit shift element, the components directly connected to each other in a rotationally fixed manner via the shift element rotate at the same rotational speed, while, in the case of a friction-locking shift element, speed differences can exist between the components even after an actuation of the shift element. This intentional or unintentional condition is nevertheless referred to, within the scope of the invention, as a rotationally fixed connection of the respective components via the shift element.

BRIEF DESCRIPTION OF THE DRAWINGS

The invention is explained in greater detail with reference to the following figures. In the figures, the following is shown:

FIG. 3 shows a shift pattern of the transmission device according to FIG. 1;

DETAILED DESCRIPTION

Figure 1:
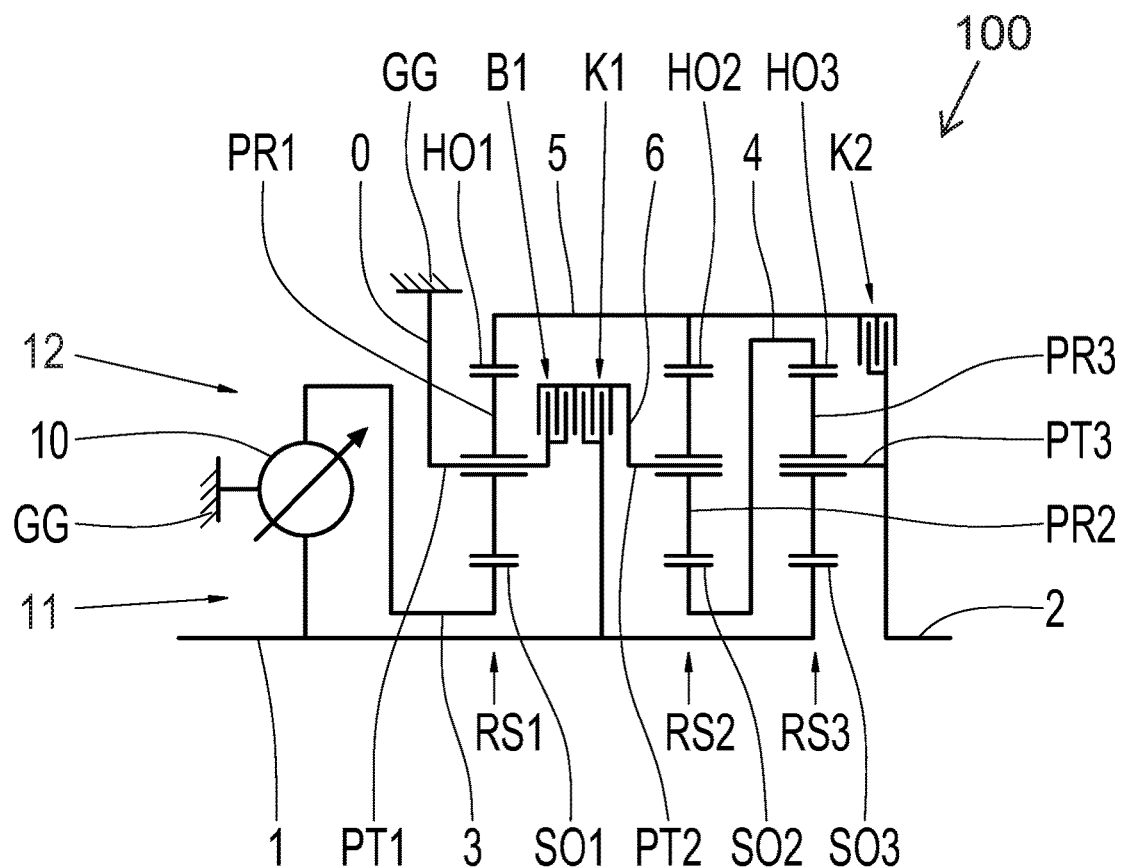
FIG. 1 shows a schematic view of a transmission device according to the invention in a preferred first embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of a power-split continuously variable transmission device 100 in the form of a mechanical IVT transmission which, in the area of an input shaft 1, is operatively connected directly, i.e., without a coupling device, to a drive machine (not represented). The drive machine is an internal combustion engine in the form of a diesel engine or a gas engine.

A torque which is made available by the drive machine and is present in the area of the input shaft 1 is guidable along multiple power paths, wherein a variator 10 is provided for varying a ratio of the respective power path, whereby the overall gear ratio of the transmission device 100 is continuously variable to the desired extent via the variator 10.

The shares of the torque present on the transmission input side in the area of the input shaft 1, which are guided along the power paths, are guided in the direction of the output shaft 2.

The transmission 100 further includes a first shift element B1, a second shift element K1, and a third shift element K2 and one first planetary gear set RS1 connected to the variator 10. The transmission 100 also includes a second planetary gear set RS2 which is connected to the first planetary gear set RS1. The transmission 100 also includes a third planetary gear set RS3 which is connected to the second planetary gear set RS2. The first shift element B1 is a brake and each of the second and third shift elements K1 and K2 is a clutch. The variator 10, the first, second, and third shift elements B1, K1 and K2, and the first, second, and third planetary gear sets RS1, RS2 and RS3 are arranged between the input shaft 1 and the output shaft 2 of the transmission 100. The first, second, and third planetary gear sets RS1, RS2 and RS3 are simple (minus) planetary gear sets.

The following nomenclature applies for a minus planetary gear set: the first element of the minus planetary gear set is a sun gear, the second element of the minus planetary gear set is a planet carrier, i.e., carrier, and the third element of the minus planetary gear set is a ring gear.

The first planetary gear set RS1 includes a first element E11, a second element E12, and a third element E13, wherein the first element E11 is a sun gear SO1, the second element E12 is a planet carrier or carrier PT1, and the third element E13 is a ring gear HO1.

In a known way, the sun gear SO1 intermeshes with one or several planet gears PR1 which are rotatably mounted on the planet carrier PT1 and intermesh with the ring gear HO1, and so, with the planet carrier PT1 held and the sun gear SO1 rotating, the ring gear HO1 rotates in the direction of rotation counter to that of the sun gear SO1. The carrier PT1 is permanently fixed on a rotationally fixed component, a transmission housing GG, which is marked by reference sign 0.

The second planetary gear set RS2 includes a first element E21, a second element E22, and a third element E23, wherein the first element E21 is a sun gear SO2, the second element E22 is a planet carrier or carrier PT2, and the third element E23 is a ring gear HO2.

In a known way, the sun gear SO2 intermeshes with one or several planet gears PR2 which are rotatably mounted on the planet carrier PT2 and intermesh with the ring gear HO2, and so, with the planet carrier PT2 held and the sun gear SO2 rotating, the ring gear HO2 rotates in the direction of rotation counter to that of the sun gear SO2.

The third planetary gear set RS3 includes a first element E31, a second element E32, and a third element E33, wherein the first element E31 is a sun gear SO3, the second element E32 is a planet carrier or carrier PT3, and the third element E33 is a ring gear HO3.

In a known way, the sun gear SO3 intermeshes with one or several planet gears PR3 which are rotatably mounted on the planet carrier PT3 and, for their part, intermesh with the ring gear HO3, and so, with the planet carrier PT3 held and the sun gear SO3 rotating, the ring gear HO3 rotates in the direction of rotation counter to that of the sun gear SO3.

The variator 10 is a planetary roller variator. As is known, a planetary roller variator has a primary side 11 and a secondary side 12. In addition, the planetary roller variator is fastened, i.e., fixed to the transmission housing GG. The primary side 11 is rotationally connected to the input shaft 1 of the transmission 100.

The secondary side 12 of the variator 10 is rotationally fixed via a third shaft 3 to the sun gear SO1 of the first planetary gear set RS1. In addition, the input shaft 1 is rotationally fixable via the clutch K1 to the sixth shaft 6 and, therefore, to the carrier PT2 of the second planetary gear set RS2. In addition, the input shaft 1 is rotationally fixed to the sun gear SO3.

The ring gear HO2 is rotationally fixed via a fifth shaft 5 to the ring gear HO1. The ring gear HO3 is rotationally fixed to the sun gear SO2 via a fourth shaft 4. The carrier PT3 is rotationally fixed to the output shaft 2.

When the brake B1 is actuated, i.e., engaged, the carrier PT1 is rotationally fixed to the carrier PT2 which is fixed on the transmission housing GG and, therefore, is prevented from turning. When the clutch K1 is engaged, the input shaft 1 is rotationally fixed to the sixth shaft 6 and, therefore, to the carrier PT2. When the clutch K2 is engaged, the ring gears HO1 and HO2, i.e., the fifth shaft 5, are rotationally fixed to the carrier PT3, i.e., to the output shaft.

In this case, three ranges of ratios, i.e., first mode FB1, second mode FB2, and third mode FB3 for forward travel, is implementable in the transmission device 100 by selective control of the first, second and third shift elements B1, K1 and K2, wherein the first mode FB1 is reversible, i.e., is implementable as a reverse mode, by adjusting the variator 10. The changeover between the modes takes place by the alternate opening and closing of two of the first, second, and third shift elements at a speed-synchronized point.

The first, second, and third planetary gear sets RS1, RS2 and RS3 are arranged axially adjacent to each other in order to enable the transmission device 100 to be arranged in an installation-space-favorable manner in the radial direction. The first planetary gear set RS1 is arranged axially between the variator 10 and the second planetary gear set RS2. The second planetary gear set RS2 is arranged axially between the first planetary gear set RS1 and the third planetary gear set RS3. The transmission 100 according to FIG. 1 is in a standard arrangement including a coaxial driven end.

Through the selection of suitable ratios, the sun gear SO3 (via the drive machine, fixed ratio) and the ring gear HO3 (via the variator, infinitely variable ratio) of the third planetary gear set RS3 are operable at the same circumferential speed, although in opposite directions, and so the output carrier PT3 is at a standstill, i.e., the rotational speed of the output carrier PT3 is zero (geared neutral). If the rotational speed of the ring gear HO3 is changed by an adjustment of the variator ratio, the carrier PT3 begins to turn. The vehicle starts. In this way, a launch clutch is omitted in an advantageous way.

Figure 2:
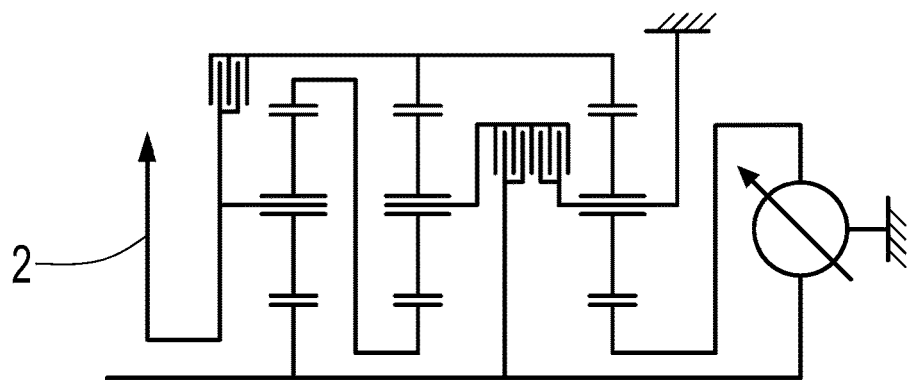
FIG. 2 shows a schematic view of a transmission device according to the invention in a preferred second embodiment.

In contrast to FIG. 1, the transmission according to FIG. 2 is a so-called front-transverse arrangement including a lateral driven end.

FIG. 3 shows a shift pattern of the transmission device 100, in table form. As shown in the shift pattern, in order to implement the first range of ratios, i.e. the first mode FB1, for forward travel, the first shift element B1 is to be engaged, while the second and third shift elements K1 and K2 are in the disengaged operating condition. If there is an appropriate demand for implementing the second range of ratios, i.e. the second mode FB2, for forward travel, the first shift element B1 is to be disengaged if the first mode FB1 for forward travel is presently engaged, the third shift element K2 is to be engaged, and the second shift element K1 is left in the disengaged operating condition. However, if there is an appropriate demand for implementing the third range of ratios, i.e. the third mode FB3, for forward travel, the second shift element K1 is to be engaged, the third shift element K2 is transferred into the disengaged operating condition, and the first shift element B1 is kept in the disengaged operating condition. As described above, the second and third shift elements K1 and K2 are clutches and the first shift element B1 is a brake.

The reverse operation is implemented via the first mode FB1, in that the variator 10 is adjusted, i.e., reversed.

When the first range of ratios, the first mode FB1, for forward travel or travel in reverse is engaged, a lesser first share of the torque introduced into the transmission device 100 via the input shaft 1 is guided via the variator 10 in the direction of the output shaft 2 and a greater second share of the torque is guided into the third planetary gear set RS3 via the direct connection of the input shaft 1 to the sun gear SO3. Therefore, the power flow in the first range of ratios FB1 takes place in a power-split manner.

When the third range of ratios, third mode FB3, for forward travel is engaged, a lesser first share of the torque introduced into the transmission device 100 via the input shaft 1 is also guided via the variator 10 in the direction of the output shaft 2 and a greater second share of the torque is guided into the second planetary gear set RS2 via the clutch K1 and into the third planetary gear set RS3 via the direct connection to the sun gear SO3. Therefore, the power flow in the third range of ratios FB3 takes place in a power-split manner.

When the second range of ratios, second mode FB2, for forward travel is engaged, the total torque introduced into the transmission device 100 via the input shaft 1 is guided via the variator 10 in the direction of the output shaft 2 without power splitting, whereby the second range of ratios FB2 is a so-called direct mode, the spread of gear ratios of which corresponds to the spread of gear ratios of the variator 10.

A ratio of the transmission device 100 is continuously variable within each of the first, second, and third modes FB1, FB2 and FB3 via the variator 10.

Figure 4:
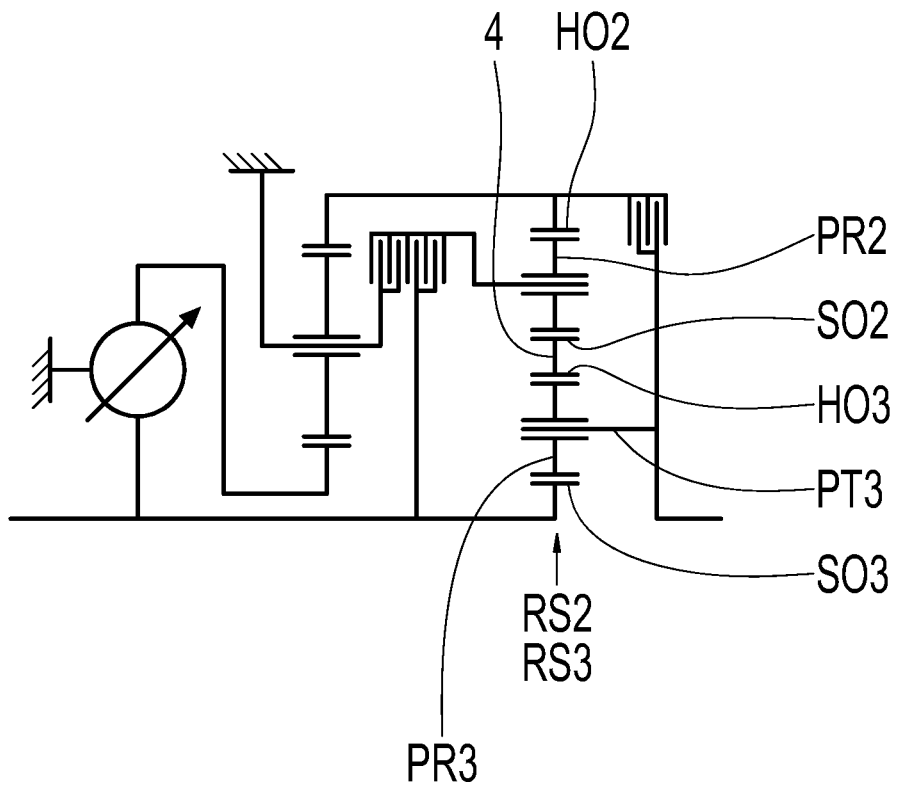
FIG. 4 shows a schematic view of a transmission device according to the invention in a preferred third embodiment.

FIG. 4 shows the transmission in a nested gear set arrangement, i.e., the second planetary gear set RS2 is arranged radially outside the third planetary gear set RS3. This is possible due to the fixed sun gear-ring gear coupling, i.e., the fixed connection between the sun gear SO2 of the second planetary gear set RS2 and the ring gear HO3 of the third planetary gear set RS3. As a result, an axially even more compact version of the transmission 100 is possible.

Figure 5:
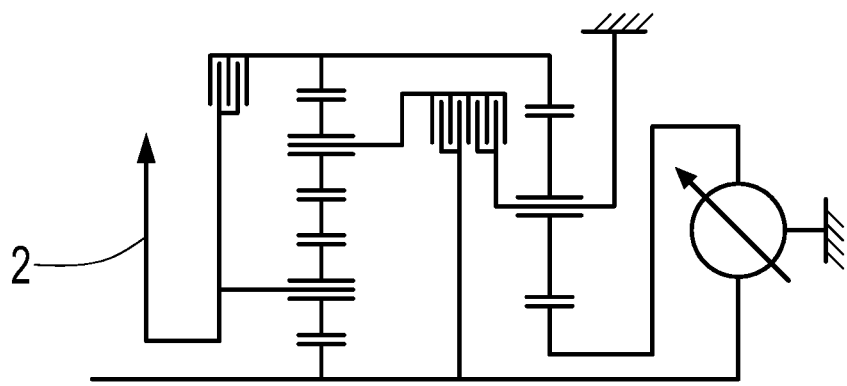
FIG. 5 shows a schematic view of a transmission device according to the invention in a preferred fourth embodiment.

In contrast to FIG. 4, the transmission according to FIG. 5 is a so-called front-transverse arrangement including a lateral driven end.

Figure 6:
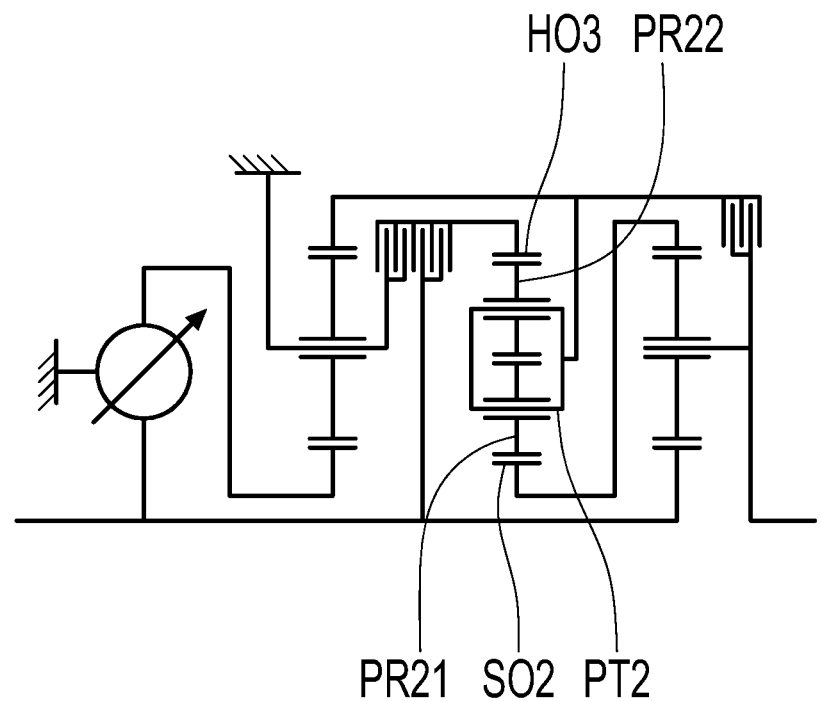
FIG. 6 shows a schematic view of a transmission device according to the invention in a preferred fifth embodiment.

FIG. 6 shows the transmission device 100 in one further embodiment. The transmission 100 includes a plus planetary gear set, wherein the second planetary gear set RS2 is the plus planetary gear set.

The following nomenclature applies for a plus planetary gear set: the first element is the sun gear, the second element is the ring gear, and the third element is the planet carrier, i.e., the carrier.

In FIG. 6, the second planetary gear set RS2 includes the same sun gear SO2, inner planet gears PR21, and outer planet gears PR22, which are rotatably mounted on the carrier PT2 (third element E23), and a ring gear HO2 (second element E22). Due to the interchange, the carrier PT2 of the second planetary gear set RS2 is connected to the ring gear HO1 of the first planetary gear set RS1 and via the clutch K2 to the carrier PT3. When the brake B1 is actuated, the carrier PT1 of the first planetary gear set RS1 is rotationally fixed to the ring gear HO2 of the second planetary gear set RS2. When the clutch K1 is engaged, the input shaft 1 is rotationally fixed to the ring gear HO2 of the second planetary gear set RS2. The transmission 100 according to FIG. 6 is in a standard arrangement including a coaxial driven end.

A transmission device in which each of the first and the second planetary gear sets is a minus planetary gear set and the third planetary gear set is a plus planetary gear set is not represented, but is also preferred.

Figure 7:
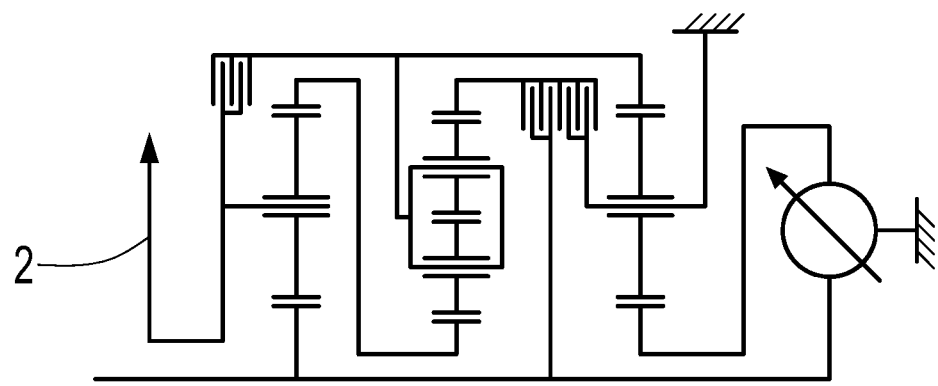
FIG. 7 shows a schematic view of a transmission device according to the invention in a preferred sixth embodiment.

In contrast to FIG. 6, the transmission according to FIG. 7 is a so-called front-transverse arrangement including a lateral driven end.

FIGS. 8 to 13 show the transmission 100 in a hybrid application in three embodiments. The input shaft 1, in particular, is suitable for the connection of an electric machine EM.

Figure 8:
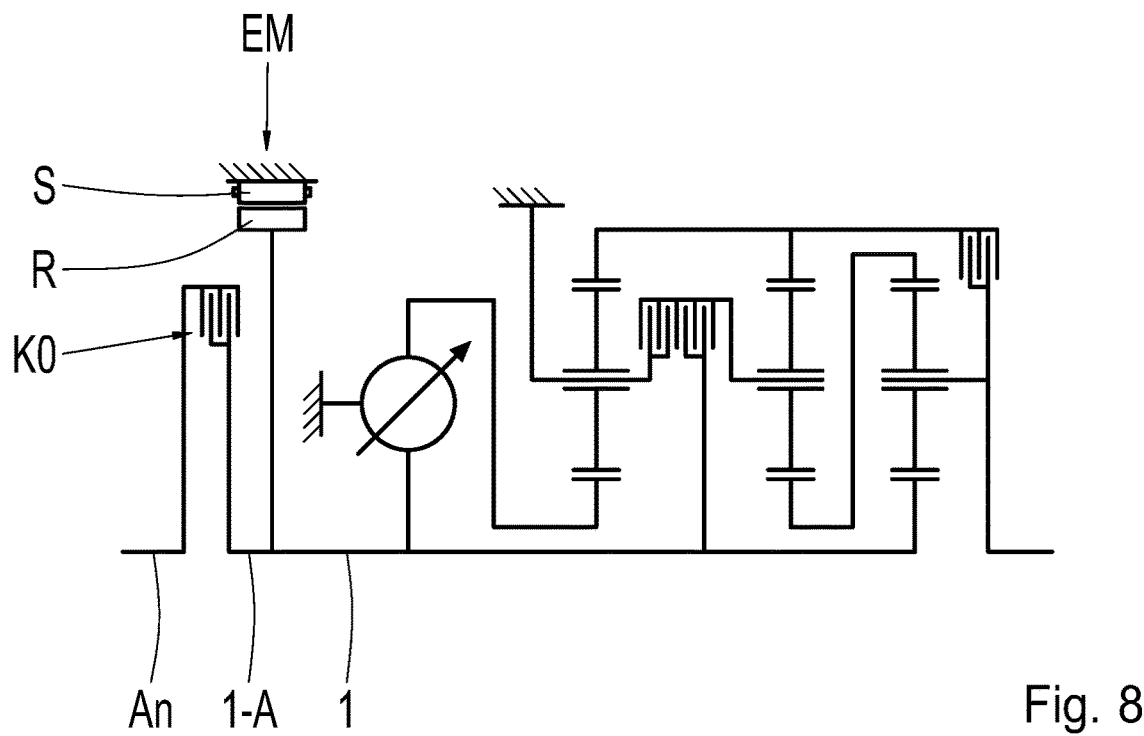
FIG. 8 shows a schematic view of a transmission device according to the invention in a preferred further embodiment.

The transmission according to FIG. 8 includes an electric machine EM, the stator S of which is rotationally fixed to the rotationally fixed component GG, while a rotor R of the electric machine EM is rotationally fixed to the input shaft 1. Moreover, the input shaft 1 is rotationally fixable, at the mounting interface 1-A, via an intermediate separating clutch K0 which is configured as a lamellar shift element in this case, to a connecting shaft AN which, in turn, is connected to a crankshaft of the drive machine (not represented). Due to the rotationally fixed connection of the rotor R to the input shaft 1, the electric machine EM is located coaxially to the input shaft 1.

Purely electric driving is implementable via the electric machine EM, wherein, in this case, the separating clutch K0 is disengaged in order to decouple the input shaft 1 from the connecting shaft AN and to not entrain the internal combustion engine. All continuously variable modes are utilizable electrically. A start into the internal combustion engine-driven modes is always possible. For the rest, the embodiment according to FIG. 8 corresponds to the variant according to FIG. 1, and therefore reference is made to the description thereof.

Figure 11:
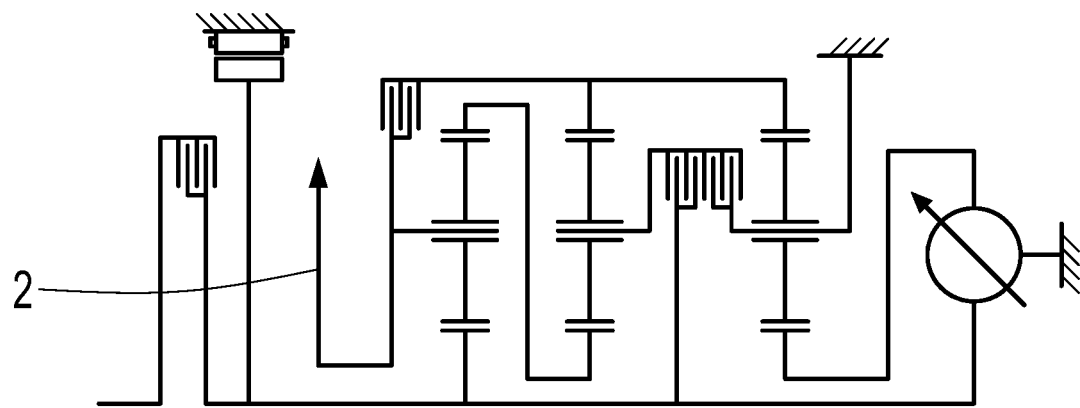
FIG. 11 shows a schematic view of a transmission device according to the invention in a preferred further embodiment.

In contrast to FIG. 8, the transmission according to FIG. 11 is a so-called front-transverse arrangement including a lateral driven end.

Figure 9:
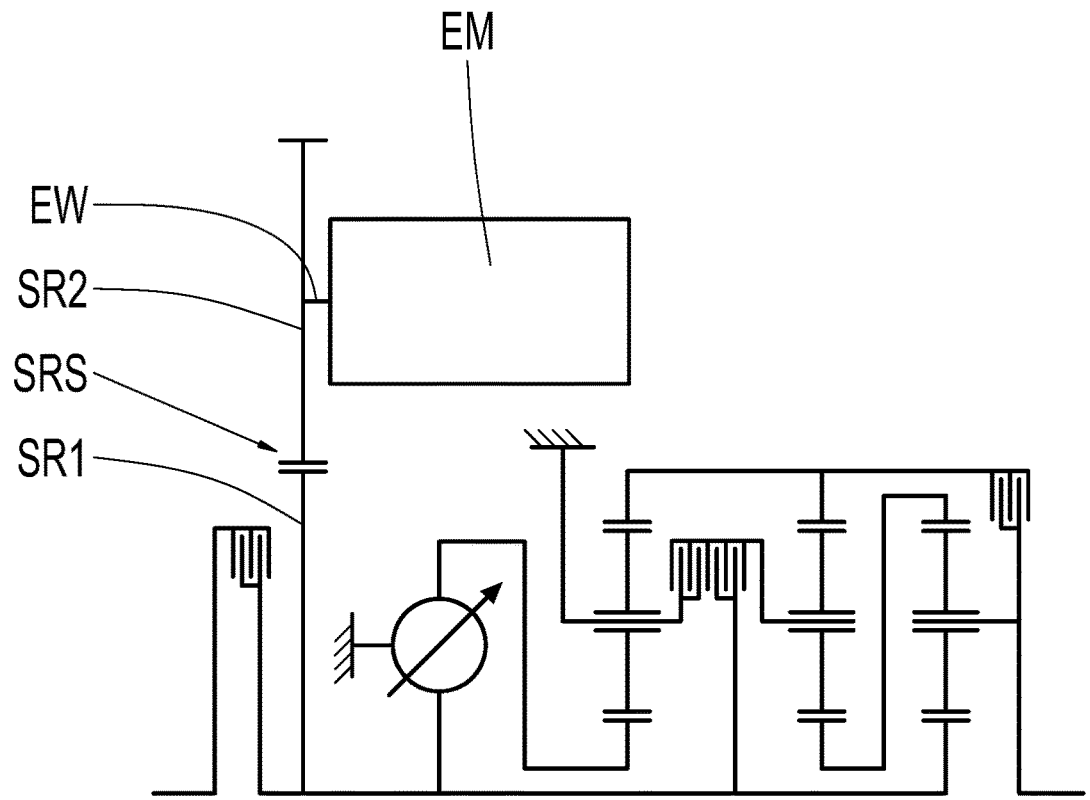
FIG. 9 shows a schematic view of a transmission device according to the invention in a preferred further embodiment.

Moreover, FIG. 9 shows a schematic view of a transmission 100 according to a further design option of the invention, which largely corresponds to the preceding variant represented in FIG. 8. The difference is that the electric machine EM is not arranged coaxially, but rather axially offset with respect to the input shaft 1. Consequently, a rotor (not represented in detail in this case) of the electric machine EM and the input shaft 1 are also not connected to each other in a rotationally fixed manner, but rather are coupled to each other via an intermediate spur gear stage SRS. In this case, a first spur gear SR1 of the spur gear stage SRS is located on the input shaft 1 in a rotationally fixed manner and intermeshes with a second spur gear SR2 which is arranged, in a rotationally fixed manner, on an input shaft EW of the electric machine EM. This input shaft EW then establishes the connection to the rotor within the electric machine EM.

For the rest, the embodiment according to FIG. 9 corresponds to the variant according to FIG. 8, and therefore reference is made to the description thereof.

Figure 12:
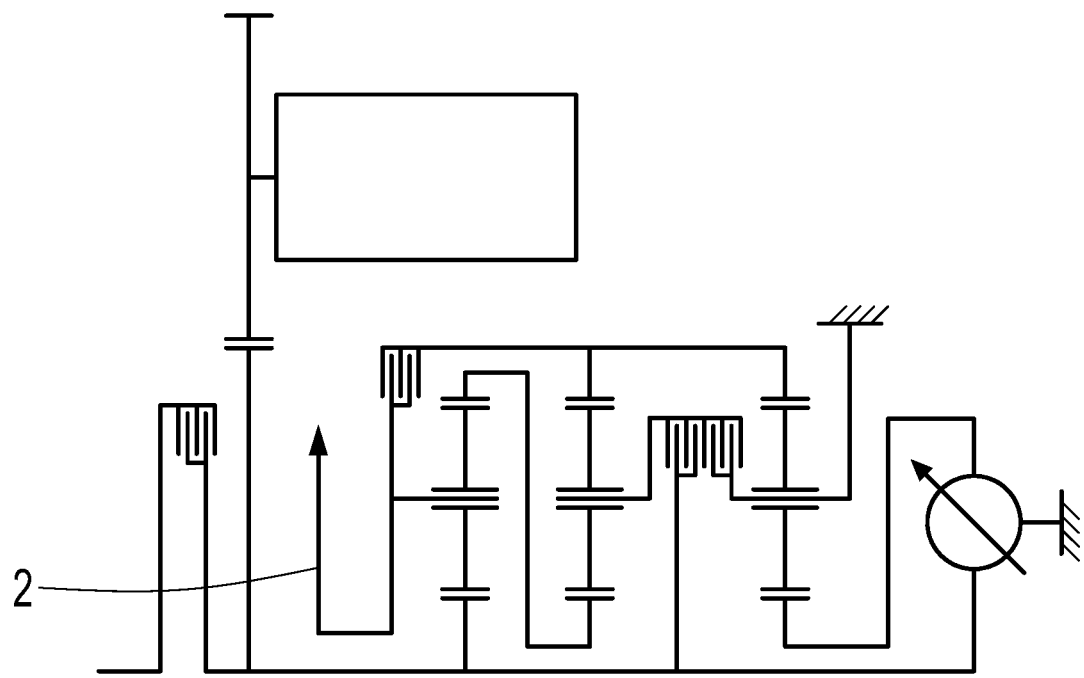
FIG. 12 shows a schematic view of a transmission device according to the invention in a preferred further embodiment.

In contrast to FIG. 9, the transmission according to FIG. 12 is a so-called front-transverse arrangement including a lateral driven end.

Figure 10:
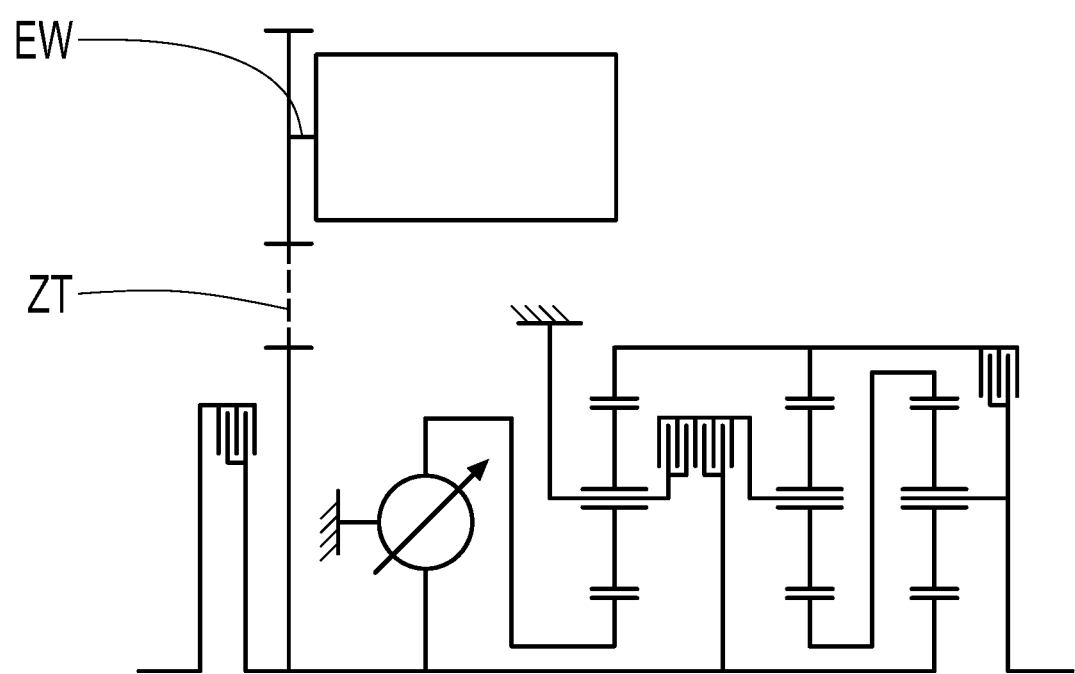
FIG. 10 shows a schematic view of a transmission device according to the invention in a preferred further embodiment.

In addition, FIG. 10 shows a schematic of a transmission 100 according to a further embodiment of the invention, which also essentially corresponds again to the variant according to FIG. 8. As is already the case with the embodiment according to FIG. 9, the electric machine EM is not arranged coaxially, however, but rather axially offset with respect to the input shaft 1. A rotationally fixed coupling between the input shaft 1 and a rotor (not represented) of the electric machine EM is achieved in this case via a flexible traction drive mechanism ZT which is preferably present as a chain drive. This flexible traction drive mechanism ZT couples the input shaft 1 to an input shaft EW of the electric machine EM in this case. Otherwise, the variant according to FIG. 10 corresponds to the embodiment according to FIG. 8, and therefore reference is made to the description thereof.

Figure 13:
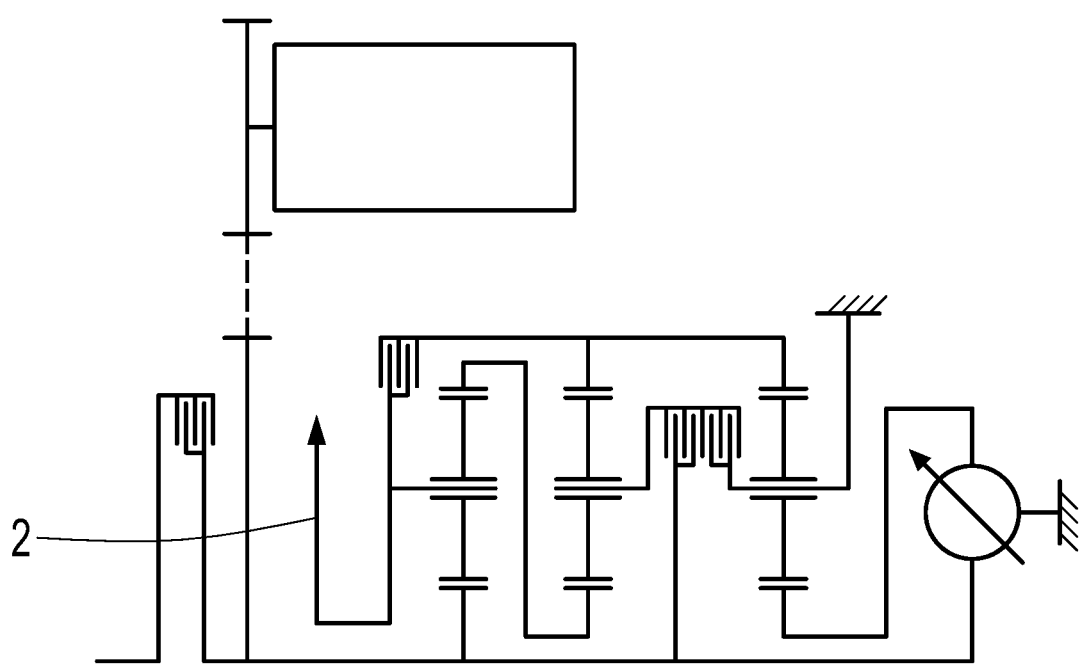
FIG. 13 shows a schematic view of a transmission device according to the invention in a preferred further embodiment.

In contrast to FIG. 10, the transmission according to FIG. 13 is a so-called front-transverse arrangement including a lateral driven end.

The hybrid application has been described with reference to the embodiment according to FIG. 1. The remaining embodiments can also be hybridized, of course, i.e., also the embodiments according to FIGS. 2 to 7. The plus planetary gear set variants, which are not represented but which have been described, are also appropriate for a hybrid application.

With the aid of the embodiments according to the invention, a transmission having a compact design and good efficiency is implementable.

Modifications and variations can be made to the embodiments illustrated or described herein without departing from the scope and spirit of the invention as set forth in the appended claims.

REFERENCE CHARACTERS 1 input shaft
2 output shaft, second shaft
3 third shaft
4 fourth shaft
5 fifth shaft
6 sixth shaft
10 variator unit, variator, planetary roller variator
11 primary side variator unit
12 secondary side variator unit
100 power-split continuously variable transmission device, continuously variable planetary transmission
An connecting shaft
B1 first shift element, brake
E11 first element
E12 second element
E13 third element
E21 first element
E22 second element
E23 third element E31 first element
E32 second element
E33 third element
EM electric machine
FB1 first mode, forward or in reverse
FB2 second mode, forward
FB2 third mode, forward
HO1 first ring gear
HO2 second ring gear
HO3 third ring gear
K0 separating clutch
K1 second shift element, clutch
K2 third shift element, clutch
PR1 planet gear
PR2 planet gear
PR3 planet gear
PR21 inner planet gear
PR22 outer planet gear
PT1 first planet gear carrier, carrier
PT2 second planet gear carrier, carrier
PT3 third planet gear carrier, carrier
RS1 first planetary gear set
RS2 second planetary gear set
RS3 third planetary gear set
R rotor
S stator
SO1 first sun gear
SO2 second sun gear
SO3 third sun gear
SRS spur gear stage
SR1 spur gear
SR2 spur gear
ZT flexible traction drive mechanism

The invention claimed is:

1. A power-split continuously variable transmission device (100), comprising:
an input shaft (1);
an output shaft (2);
a first planetary gear set (RS1) arranged between the input shaft (1) and the output shaft (2);
a second planetary gear set (RS2) connected to the first planetary gear set (RS1) and arranged between the input shaft (1) and the output shaft (2);
a third planetary gear set (RS3) connected to the second planetary gear set (RS2) and arranged between the input shaft (1) and the output shaft (2); and
a variator unit (10) for transmitting power in a continuously variable manner from the input shaft (1) to the first planetary gear set (RS1), the variator unit (10) having a first shift element (B1), a second shift element (K1) and a third shift element (K2), selective actuation of the first, second and third shift elements (B1, K1, K2) providing different power paths between the input shaft (1) and the output shaft (2) while making a first mode (FB1), a second mode (FB2) and a third mode (FB3) available,
wherein the variator unit (10) is fixed to a rotationally fixed component (GG), a primary side (11) of the variator unit (10) is rotationally fixed to the input shaft (1), and a secondary side (12) of the variator unit (10) is rotationally fixed to a first element (E11) of the first planetary gear set (RS1),
wherein the input shaft (1) is rotationally fixable to a second element (E22) of the second planetary gear set (RS2) via the second shift element (K1), and the input shaft (1) is rotationally fixed to a first element (E31) of the third planetary gear set (RS3),
wherein a second element (E12) of the first planetary gear set (RS1) is fixed to the rotationally fixed component (GG),
wherein the second element (E22) of the second planetary gear set (RS2) is fixable to the rotationally fixed component (GG) via the first shift element (B1),
wherein a first element (E21) of the second planetary gear set (RS2) is rotationally fixed to a third element (E33) of the third planetary gear set (RS3),
wherein a third element (E13) of the first planetary gear set (RS1) is rotationally fixed to a third element (E23) of the second planetary gear set (RS2),
wherein a second element (E32) of the third planetary gear set (RS3) is rotationally fixed to the output shaft (2) and is rotationally fixable to the third element (E13) of the first planetary gear set (RS1) and the third element of the second planetary gear set (RS2) via the third shift element (K2).

2. The transmission device (100) of claim 1, wherein the first, second and third planetary gear sets (RS1, RS2, RS3) are arranged axially adjacent to one another.

3. The transmission device (100) of claim 1, wherein the second planetary gear set (RS2) is arranged radially outside the third planetary gear set (RS3).

4. The transmission device (100) of claim 1, wherein:
the first mode (FB1) is continuously variable power-split and implemented when the first shift element (B1) is engaged,
the second mode (FB2) is continuously variable variator-driven and implemented when the third shift element (K2) is engaged, and
the third mode (FB3) is continuously variable power-split and implemented when the second shift element (K1) is engaged.

5. The transmission device (100) of claim 1, further comprising an electric machine (EM), a rotor (R) of the electric machine (EM) connected to the input shaft (1), the output shaft (2) or another shaft (3, 4, 5, 6).

6. The transmission device (100) of claim 5, further comprising a separating clutch, the input shaft (1) being rotationally fixable to a connecting shaft via the separating clutch.

7. The transmission device (100) of claim 5, wherein the electric machine (EM) is arranged coaxially to the input shaft (1).

8. The transmission device (100) of claim 5, wherein the electric machine (EM) is arranged axially parallel to the input shaft (1).

9. A motor vehicle drive train comprising the transmission device (100) of claim 1.

* * * * *